(12) United States Patent
De Nichilo

(10) Patent No.: US 6,454,556 B1
(45) Date of Patent: Sep. 24, 2002

(54) VACUUM AND PRESSURE TIGHT COOLING-VENTILATING DEVICE FOR THERMOFORMING STATIONS

(75) Inventor: Giorgio De Nichilo, Milan (IT)

(73) Assignee: GAM Impianti S.A., Croglio (CH)

( * ) Notice: Subject to any disclaimer, the term of this patent is extended or adjusted under 35 U.S.C. 154(b) by 0 days.

(21) Appl. No.: 09/487,152

(22) Filed: Jan. 19, 2000

(30) Foreign Application Priority Data

Mar. 26, 1999 (IT) .......................................... M199A0638

(51) Int. Cl.$^7$ ............................................. B29C 59/18
(52) U.S. Cl. ........................ 425/384; 425/388; 425/446; 425/812; 454/434; 454/338; 415/128; 415/157
(58) Field of Search ................................. 425/317, 384, 425/388, 404, 445, 446, 812; 264/237, 348, 554; 454/334, 338; 415/126, 150, 157

(56) References Cited

U.S. PATENT DOCUMENTS

| | | | | |
|---|---|---|---|---|
| 3,625,629 A | * | 12/1971 | Morrison et al. | ........... 415/157 |
| 3,713,765 A | * | 1/1973 | Rise | ........................... 425/384 |
| 5,161,941 A | * | 11/1992 | Ratner | ........................ 415/150 |
| 5,217,563 A | * | 6/1993 | Niebling et al. | ............ 156/382 |
| 5,620,715 A | * | 4/1997 | Hart et al. | .................. 425/143 |

* cited by examiner

*Primary Examiner*—Jan H. Silbaugh
*Assistant Examiner*—Donald Heckenberg
(74) *Attorney, Agent, or Firm*—Hedman & Costigan, P.C.

(57) ABSTRACT

A vacuum and pressure tight cooling or ventilating device, specifically designed for thermoforming stations, comprises a shutter element for opening and closing respectively the cooling and ventilating device, the shutter element being mounted on an air inlet section of the ventilating device which, in turn, is completely arranged outside of its related thermoforming station.

5 Claims, 3 Drawing Sheets

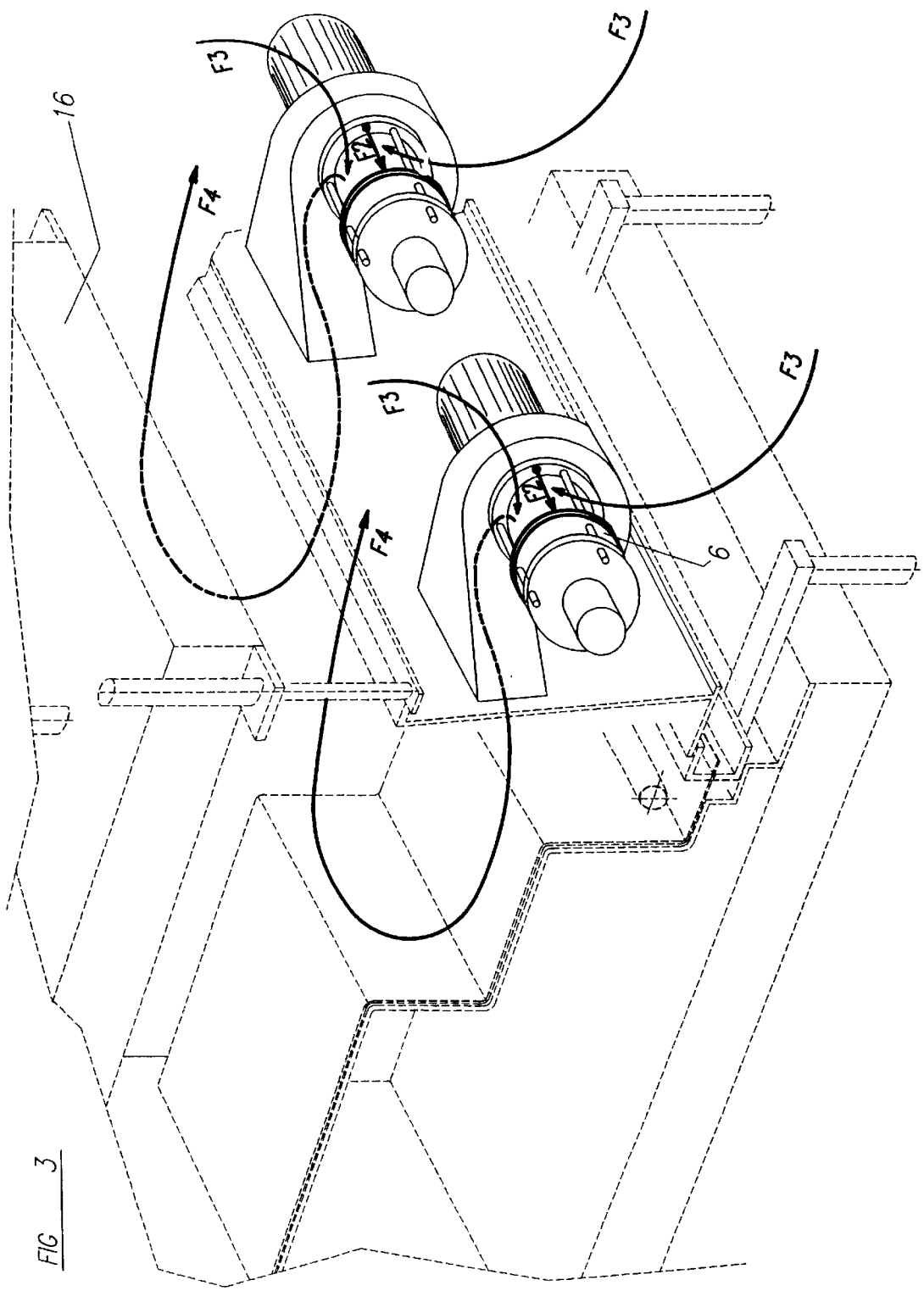

VACUUM AND PRESSURE TIGHT COOLING-VENTILATING DEVICE FOR THERMOFORMING STATIONS

BACKGROUND OF THE INVENTION

The present invention relates to a vacuum and pressure tight ventilating or cooling device, specifically designed for thermoforming stations.

The invention also relates to a thermoforming station provided with the mentioned device.

More specifically, the thermoforming stations the invention is related to are conventionally provided for molding a sheet-like (or plate or coil-like) plastic material by drawing this material inside a bell assembly arranged at a position opposite to a mold bearing assembly, so as to be closed on the latter.

In particular, in such a thermoforming station, the sheet-like plastic material is brought at first to its plasticizing temperature and then it is locked, in a molding position, by closing the mentioned bell assembly against a perimetrical edge of the plastic material.

Then, the inside of the bell assembly is evacuated to draw the plastic material into the bell assembly, in order to provide said plastic material with a pre-stretched ball configuration.

Then, a mold is arranged under the thus formed ball, and the vacuum direction is reversed so as to cause the plastic material to be pressed against the mold to receive the desired molded pattern.

Then, the plastic material as molded is allowed to cool, the bell assembly being constantly closed on the mold to hold the plastic material on the mold itself.

By the above mentioned molding method a lot of article of manufactures are made, such as bags, car components, cells and counter-doors for domestic refrigerators, bath articles and the like.

In the above mentioned method, the cooling step represents the most critical processing step since the outer surface of the molded article must be evenly cooled. In fact, if the outer surface would not be properly evenly cooled, it could retain inner stresses which could deform the molded article which would be rejected.

Moreover, the cooling step represents the longest operating step of the thermoforming process and, in order to increase the thermoforming process yield it would be indispensable to make the cooling stage as short as possible.

SUMMARY OF THE INVENTION

Accordingly, the main object of the present invention is to provide ventilating means specifically designed for aiding air to easily circulate inside the mentioned thermoforming stations.

According to one aspect of the present invention, the above mentioned object, as well as yet other objects, which will become more apparent hereinafter, are achieved by a cooling ventilating device which comprises a vacuum and pressure tight-cooling ventilating device for a thermoforming station, wherein said device comprises, operatively coupled to form an autonomous cooling unit to be coupled to said thermoforming station, a scroll body defining an air inlet and an air outlet, air flow linearly reciprocating shutter plate disk means arranged at said air inlet of said scroll body and a driving motor-fan assembly arranged at said air outlet of said scroll body, and piston means for reciprocating said shutter means from a first opening position, opening said air inlet of said scroll body, to a second vacuum and pressure closing position, tightly closing said air inlet.

The provision, on the inventive device, of a shutter element arranged outside the thermoforming station, provides the advantage that an air jet can be easily directed and oriented in the thermoforming station.

Moreover, said outer shutter element will facilitate the assembling operations, and will reduce the operating noise (since said shutter element will break the air flow) while reducing the size of the device, to allow a desired number of ventilating devices to be easily arranged about the bell assembly.

The device according to the invention, moreover, provides the additional advantage of easily shutting off or closing the ventilating device, and this by the mentioned shutter element operating with a return force directed in the direction of the vacuum formed inside the bell assembly.

Thus, the negative pressure formed in the thermoforming station will facilitate the closing of the shutter element, while properly holding it in this closing position.

Thus, the bell assembly evacuation time as well as the cooling time will be reduced to a minimum. In particular, the cooling time can be reduced, owing to the inventive device, to total time less than 20 seconds, thereby easily overcoming a threshold of 120 cycles/hours as conventionally provided in processes designed for making domestic refrigerators, cells and counter-doors.

Advantageously, moreover, the inventive device further provides a sealing action against a possible air. overpressure generated in the thermoforming station for aiding the thermoforming process.

BRIEF DESCRIPTION OF THE DRAWINGS

The invention will be disclosed hereinafter with reference to the figures of the accompanying drawings, given only by way way of an example of a preferred embodiment of the invention.

In the drawings:

FIG. 3 illustrates the thermoforming station of FIG. 2 during a cooling operating step thereof.

DESCRIPTION OF THE PREFERRED EMBODIMENTS

Figure 1:
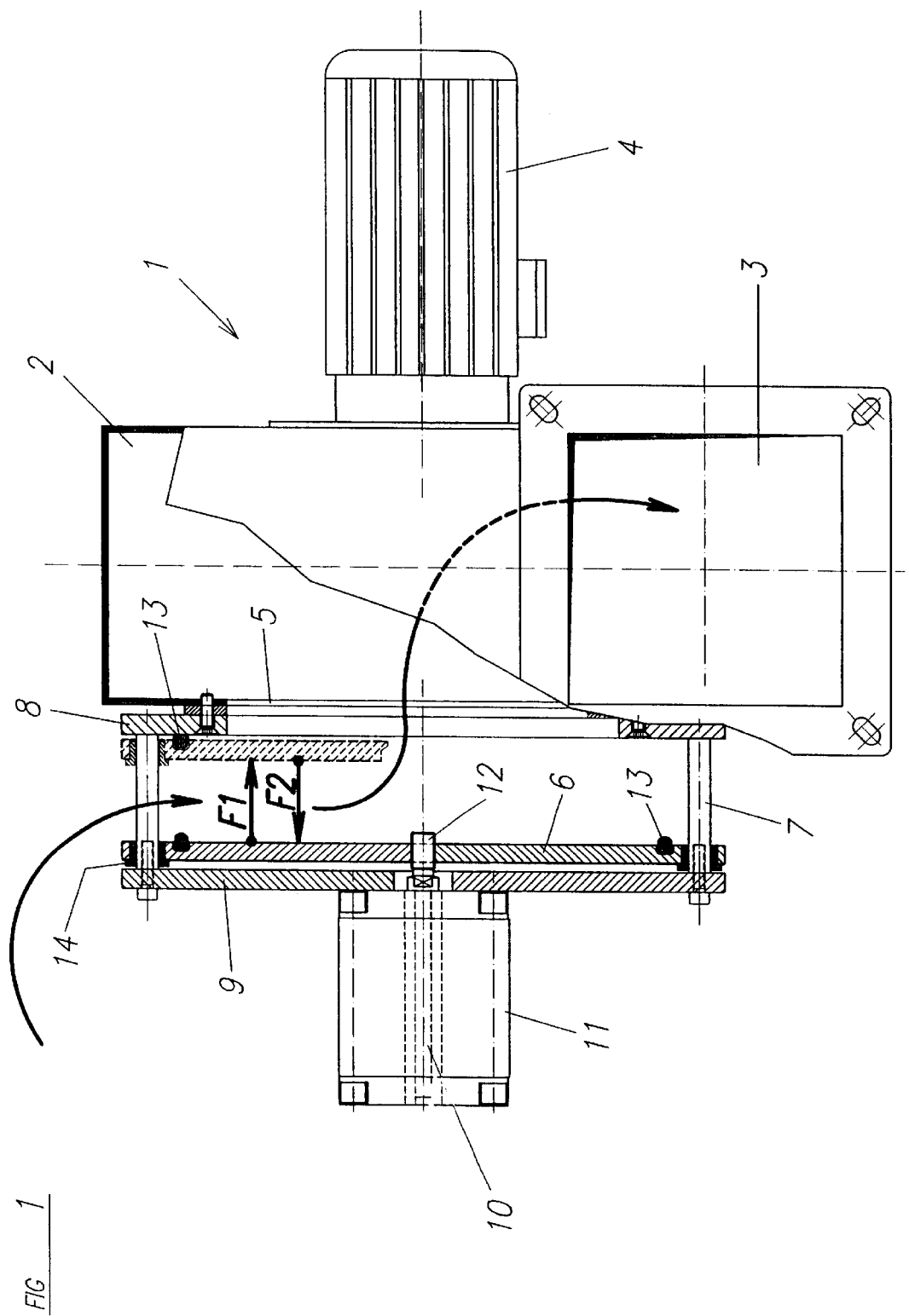
FIG. 1 illustrates the cooling ventilating device according to the present invention, with the shutter element or body being shown in a longitudinal cross-section.

The cooling ventilating device of the invention has been generally indicated by the reference number 1 in FIG. 1. Said device comprises a scroll body 2, on the front of which the air outlet 3 has been provided.

An electric motor 4 for driving the v entilating fan is coupled on a side of the scroll body 2.

Figure 2:
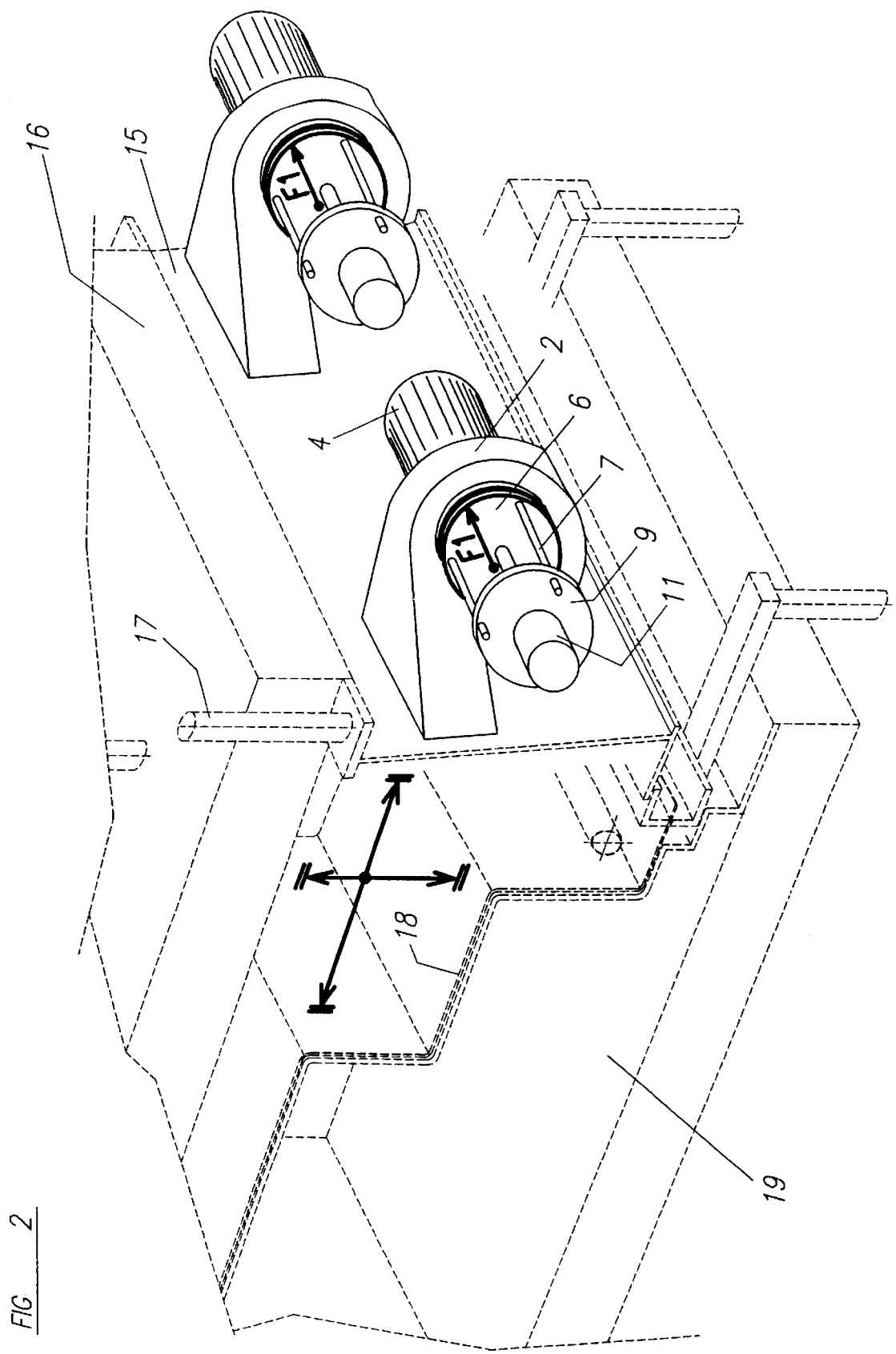
FIG. 2 is a broken away view illustrating the thermoforming station of the invention, during an evacuating operating step thereof to which two cooling ventilating devices have been applied.

At the air inlet 5 to which air inlet is formed on a side of the scroll body 2 opposite to the side of said scroll body 2 where said electric motor is coupled, the body 2, the ventilating device 1 is provided with a shutter disk plate 6, which can be driven from an open position (shown by a solid line in FIGS. 1 and 3) to a closed position (FIG. 2 and dashed in FIG. 1)

The shutter disk plate for element 6, the shape and size of which have been specifically designed for fully covering the air inlet 5 to the ventilating device 1, is slidably mounted on top and bottom rod guides 7, which are in turn mounted between top and bottom support means 8, on the air inlet 5 of the scroll body side 2, and a corresponding plate disk support 9 spaced from said top and bottom plate support means by said top and bottom rod guides.

The support plate disk 9 supports moreover a piston 10 cylinder 11 assembly, which comprises an element 12 for anchoring the piston 10 to the shutter element 6. As shown the anchoring element is coupled to one end of said piston 10, passing through a central hole of said support 9, and to a central portion of said shutter 6 to be anchored.

A gasket 13 is moreover provided for air sealing the shutter 6 on the support 8 (and, accordingly, on the ventilating device body 2, at the level of the air inlet 5 of the latter).

The sliding of the shutter 6 on the guides 7, driven by the piston 10, is aided by bushings 14.

As shown in FIGS. 2 and 3, the disclosed ventilating device forms a ventilating unit or assembly which can be coupled for example in pairs to the thermoforming station of FIGS. 2 and 3, to form an integrating part of the latter and provide cooling at any intended locations of said thermoforming station.

The thermoforming station comprises, in particular, a bell assembly 15, having a cover 16 which can be raised and lowered along guiding pins 17 through driving means (not shown).

Starting from its open position (shown by the solid line in FIG. 1), the shutter 6 is brought to its closing position against the air inlet 5 by a displacement in the direction of the arrow F1 of FIG. 2.

This displacement is driven by the piston 10 and is aided by the vacuum formed inside the thermoforming station for thermoforming the sheet material 18 on the mold pattern 19.

The generated vacuum, moreover, will facilitate the abutment and holding of the shutter 6 on the edge of the air inlet 5 thereby providing an efficient sealing of the latter.

During the cooling operation (FIG. 3), as the vacuum is released from the thermoforming station, the cover 16 of the bell assembly is raised and the shutter element 6 is driven by the cylinder and piston assembly in the direction of the arrow F2.

Then, the cooling ventilating device 1 is driven to cause cooling air to circulate in the direction of the arrows F3 and F4 of FIGS. 1 and 3.

The invention, as disclosed and illustrated, is susceptible to several modifications and variations, without departing from the scope of the invention as defined in the accompanying claims.

In particular, the thermoforming station could also be of a single piece bell type, i.e. devoid of the openable cover.

What is claimed is:

1. A vacuum and pressure tight-cooling ventilating device for a thermoforming station, wherein said device comprises an autonomous cooling unit to be operatively operatively coupled to said thermoforming station, a scroll body defining an air inlet and an air outlet, air flow linearly reciprocating shutter plate disk means arranged at said air inlet of said scroll body and a driving motor-fan assembly arranged at said air outlet of said scroll body, and piston means for reciprocating said shutter means from a first opening position, opening said air inlet of said scroll body, to a second vacuum and pressure closing position, tightly closing said air inlet.

2. A device according to claim 1, wherein said scroll body comprises, on a side of said air inlet, top and bottom support plate means coupled respectively at a top and bottom portion of said scroll body near said air inlet, a plate disk support near said piston and top and bottom rod guide means coupling said top and bottom support plate means to said plate disk support and reciprocatingly, slidably supporting, through a top and bottom sliding bushing, said shutter plate disk means.

3. A device according to claim 1, wherein said device comprises moreover sealing gasket means for sealing said shutter plate disk means at said air inlet closing position thereof.

4. A device according to claim 1, wherein said piston is coupled to said shutter plate disk means by anchoring element connecting one end of said piston to a substantially central portion of said shutter plate disk means.

5. A thermoforming station, comprising of a thermoforming-bell, at least a cooling ventilating unit according to claim 1, coupled as an autonomous cooling ventilating assembly to an outside of said thermoforming station.

* * * * *